(12) United States Patent
Walecki et al.

(10) Patent No.: US 7,116,429 B1
(45) Date of Patent: Oct. 3, 2006

(54) DETERMINING THICKNESS OF SLABS OF MATERIALS BY INVENTORS

(76) Inventors: Wojciech J. Walecki, 1631 N. First St., San Jose, CA (US) 95112; Phuc Van, 1631 N. First St., San Jose, CA (US) 95112

(*) Notice: Subject to any disclaimer, the term of this patent is extended or adjusted under 35 U.S.C. 154(b) by 270 days.

(21) Appl. No.: 10/346,818

(22) Filed: Jan. 18, 2003

(51) Int. Cl.
G01B 11/02 (2006.01)
G01B 9/02 (2006.01)

(52) U.S. Cl. .................. 356/503; 356/479; 356/492

(58) Field of Classification Search ........... 356/477, 356/479, 503, 504, 497, 630–632, 492
See application file for complete search history.

(56) References Cited

U.S. PATENT DOCUMENTS

| | | | | |
|---|---|---|---|---|
| 4,676,649 A | * | 6/1987 | Phillips | 356/500 |
| 4,999,014 A | * | 3/1991 | Gold et al. | 356/632 |
| 5,465,147 A | * | 11/1995 | Swanson | 356/503 |
| 5,473,432 A | * | 12/1995 | Sorin | 356/503 |
| 5,596,409 A | * | 1/1997 | Marcus et al. | 356/503 |
| 5,943,134 A | * | 8/1999 | Yamaguchi et al. | 356/503 |
| 6,043,774 A | * | 3/2000 | Singh et al. | 342/127 |
| 6,208,415 B1 | * | 3/2001 | De Boer et al. | 356/485 |
| 6,768,552 B1 | * | 7/2004 | Takahashi et al. | 356/479 |
| 6,775,005 B1 | * | 8/2004 | Akikuni et al. | 356/479 |
| 6,806,951 B1 | * | 10/2004 | Wack et al. | 356/237.2 |
| 6,806,963 B1 | * | 10/2004 | Walti et al. | 356/497 |
| 2006/0098206 A1 | * | 5/2006 | Kim et al. | 356/495 |

* cited by examiner

*Primary Examiner*—Hwa (Andrew) Lee
*Assistant Examiner*—Patrick Connolly

(57) ABSTRACT

A method and apparatus for determining the thickness of slabs of materials using an interferometer.

11 Claims, 7 Drawing Sheets

DETERMINING THICKNESS OF SLABS OF MATERIALS BY INVENTORS

SUMMARY OF THE INVENTION

The present invention relates to the determining the thickness of slabs of materials. More particularly, the present invention in one of its embodiments relates to measuring the thickness of slabs of materials using low coherence fringe resolved interferometer. The invention can be used for measurement of the thickness of semiconductor and other materials ranging form few micrometers up to several mm or even cm. The invention is capable of resolving interference fringes, and has resolution of the order of the fraction of the wavelength.

The invention can be used to measure thickness of the slabs of homogenous materials, thickness of the layered materials, refractive indices of the materials, and evaluate roughness of the interfaces between different material layers and alike.

The invention may be used in applications involving back-end processing of the semiconductor chips, grinding and polishing of the patterned and blanket wafers, processing of the micro-electromechanical-system (MEMs), and micro-opto-electromechanical-systems (MOEMs) [1], such as pressure monitors, micro-mirrors and similar materials.

DETAILED DESCRIPTION OF THE INVENTION

Figure 1:
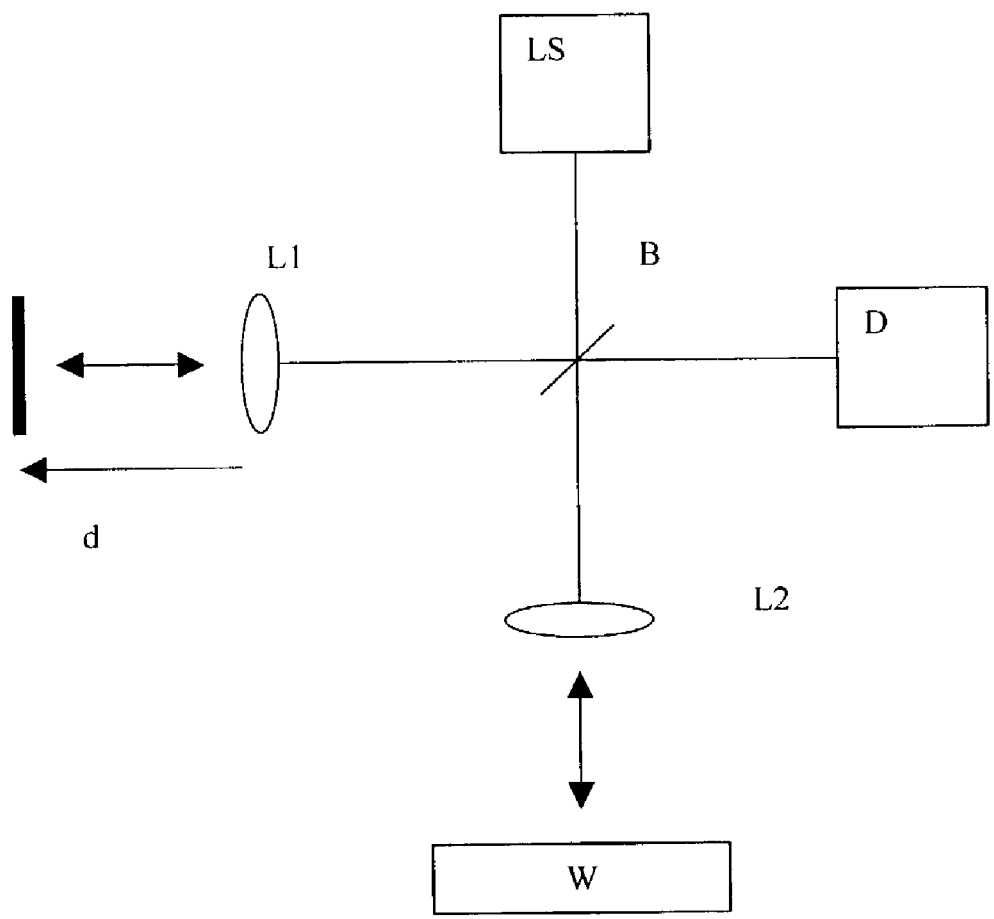
FIG. 1 is an illustration of the components of the invention.

The basic layout of the invention is presented in FIG. 1., a Michelson interferometer. A simplified system layout is shown in FIG. 1. It is a simple Michelson interferometer, in which one of the arms includes delay stage d. Light emitted by a light source LS, subsequently is divided by a beam-splitter B into two portions. The first (reference) beam propagates through the lens L1 is reflected by mirror M, passes again through lens L1 beam-splitter B and is detected by detector D. The second (signal) beam propagates through the lens L2, later is reflected by the wafer, propagates again through the lens L2, and finally is directed by beam-splitter B towards detector D. When path of signal and reference beams are approximately equal interference fringes are observed. The analysis of the interference between reference and signal beams leads to measurement of the thickness of the wafer.

When LS is a broadband, low coherence source, then the signal detected by the detector is given by:

$$I_d = \langle |E_d|^2 \rangle = \frac{1}{2}(I_r + I_s) + Re\{\langle E_r^*(t+\tau) \cdot E_s(t) \rangle\} \quad \text{Equation (1)}$$

where $I_r$ and $I_s$ are mean (dc) intensities returning from the reference (delay line) and the sample (wafer) arm of the interferometer. Delay $\tau$ is the delay between signal and reference beams which is controlled by delay stage d, it is expressed in units of time and corresponds to optical path difference between signal and reference beams.

If the light source LS in FIG. 1 has bandwidth $\Delta\lambda$, then its coherence length in vacuum is $$l_c = \frac{2c\ln(2)}{\pi} \cdot \frac{1}{\Delta\lambda}$$

where c is speed of light, then the last term in Equation 1, called, sometimes, interference term becomes significant when the optical path difference between the signal and reference arm is within one or two orders of the magnitude of the wavelength of the radiation propagating inside the interferometer. We see that the last term $I_c = Re\{\langle E_r^*(t+\tau) \cdot E_s(t) \rangle\}$ in Equation 1 is strongly varying as a function of the relative optical path interference and can be expressed in a frequency domain as [4]:

$$\tilde{I}_c(\nu) = \tilde{E}_r^*(\nu) \cdot \tilde{E}_s(\nu) \quad \text{Equation (2)}$$

From the above we obtain:

$$\tilde{I}_c(\nu) = \tilde{E}_r^*(\nu) \cdot \tilde{E}_r(\nu) \cdot |A(\nu)| \cdot \exp(-i\phi)(\nu))$$

and finally $$\tilde{I}_c(\nu) = S(\nu) \cdot |A(\nu)| \cdot \exp(-i\phi(\nu)) \quad \text{Equation (3)}$$

where $S(\nu)$ is the spectrum of the source corrected by bandwidth of optical fibers, 4×4 coupler, lenses and other components residing in arms of the interferometer, $A(\nu)$ and $\phi(\nu)$ are amplitude and phase spectrum of the sample. Therefore the measurement of the interferogram provides information about complex reflection coefficient of the sample $R(\nu) = |A(\nu)| \cdot \exp(-i\phi)(\nu))$.

Figure 2:
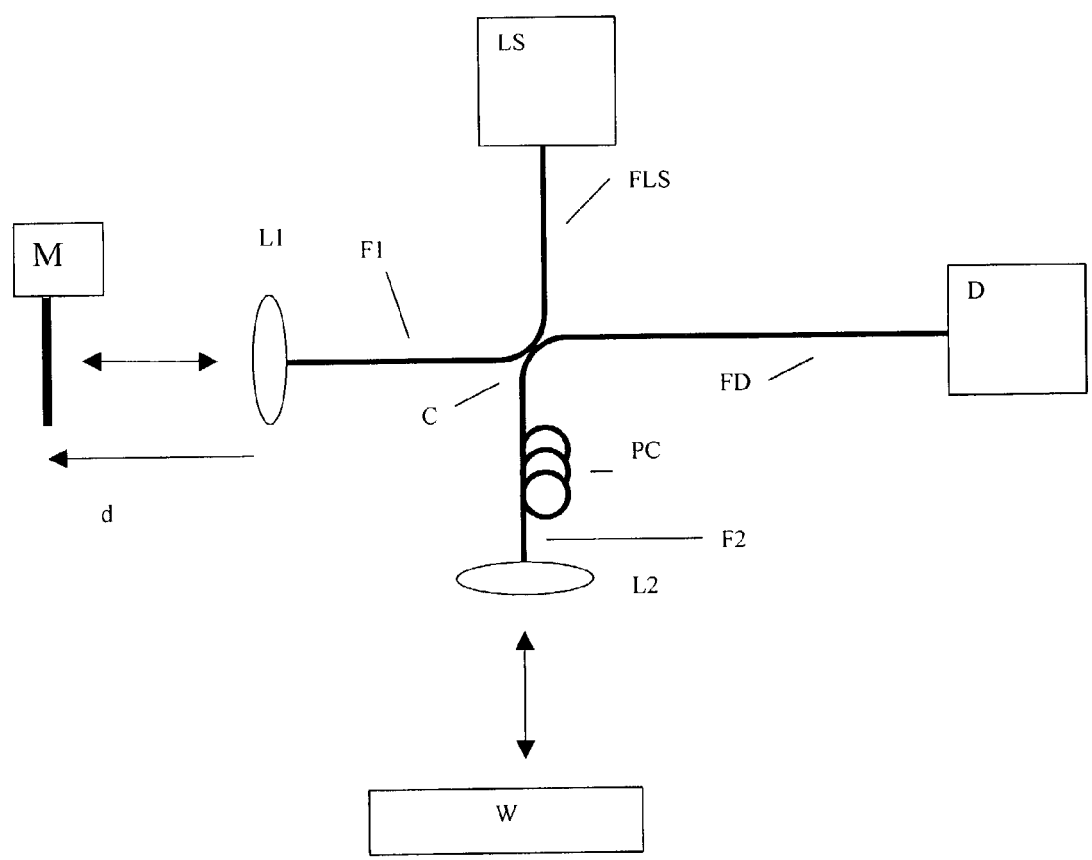
FIG. 2 is an illustration of the fiber optics implementation of the invention.

In one mode of the invention, the use of fiber optic components is presented in FIG. 2. It is a basic Michelson interferometer arrangement in which light propagates through single mode optical fibers. Light emitted by super luminescent laser diode LS, propagates through the single mode fiber FLS, subsequently is divided by the 4×4c fiber optic coupler C into two portions. The first (reference) beam propagates through the fiber F1, the lens L1 is reflected by mirror M, passes again through lens L1 beam-splitter B, propagates through the single mode fiber FD, and is detected by detector D. The second (signal) beam propagates through the fiber F2, optic polarization controller PC, lens L2, and later is reflected by the wafer W, propagates again through the lens L2, and finally is directed by fiber coupler B, through a single mode fiber FD towards detector D. When the paths of signal and reference beams are approximately equal, interference fringes are observed. The analysis of the interference between reference and signal beams leads to measurement of the thickness of the wafer.

In this implementation, the beam splitter was replaced by a 4×4 fiber optic coupler. In order to optimize the amplitude of the observed interference fringes, the state of polarization in the reference beam and signal beams are matched by a fiber optic polarization controller PC. The fiber optic polarization controller is based upon a stress induced birefringence effect and is essentially similar to one commercially available from Thorlabs Inc., model FPC031. Thorlabs catalog "Tools of trade", Vol 18, 2006.

The fiber optic implementation of this Michelson interferometer allows us to achieve superior stability of the system and eliminate noise caused by vibration of the free space components.

Simple construction includes bare minimum of components and unlike other designs does not involved closed fiber optic loops, optical isolators or/and multiple beam splitters.

Similar systems were used successfully in variety of fields including in medical applications including prominent applications. The systems employed a scheme in which only the slow varying amplitude of the interference signal was used for analysis [2], [3]. The special resolution and accuracy of systems, which did neglect the fine structure of the interference pattern, is of the same order as coherence length of the broadband source LS. In fiber optic implementation of this invention employing super-luminescence light emitting diodes it is typically limited to about 10–15 um.

This invention employs a fiber optic Michelson interferometer, allowing fringe resolved signal acquisition, and the determination of thickness, and other properties of the layers in single layer or multi-layer samples using the full information contained in the interferogram given by Equation (1).

Figure 3:
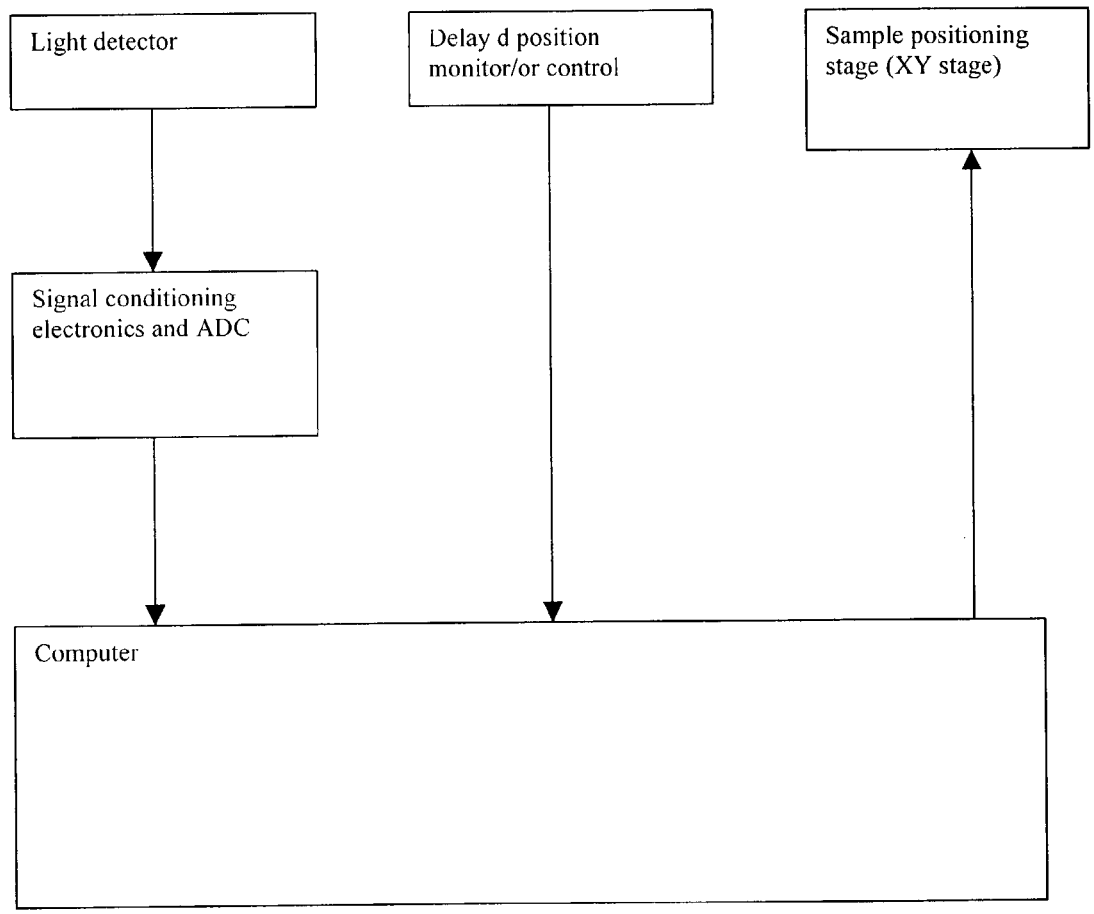
FIG. 3. is a simplified view of the components of the invention.

Typical signal observed in the experiment involving measurements of the single slab material is presented in FIG. 3. The signal originating from the detector D is conditioned and digitized by signal conditioning electronics and collected by computer. The information about the position of the delay stage d is correlated with the signal from the detector D. Based on simultaneously collected information about the position of the delay stage and the signal detected by detector D the computer is reconstructing an interferogram described by Equation 1. The computer has ability to record and collect data in various points of wafer by the scanning positioning stage.

Figure 4:
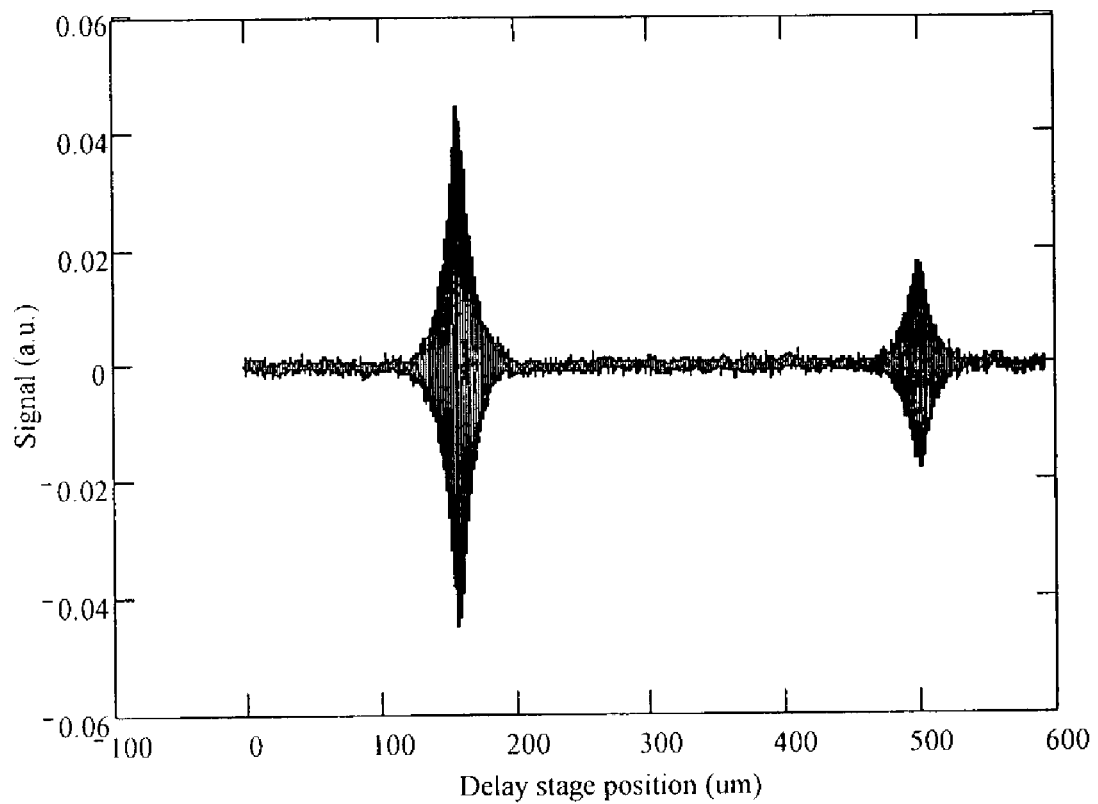
FIG. 4 is a typical interferogram observed when abeam impinges slab material.

Typical interferometric data is presented in FIG. 4.

Figure 5:
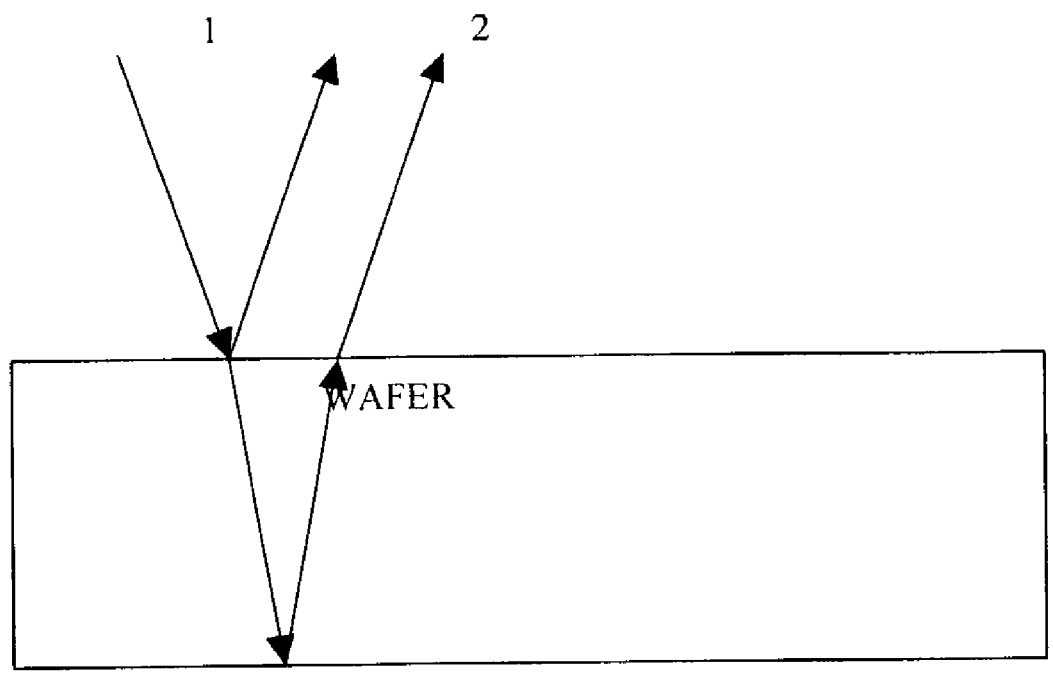
FIG. 5 is a schematic view of the wafer.

The data presented in FIG. 4 reveals two distinct features: one centered around 150 um, and the second centered around 500 um. The first feature has been assigned to the beam reflected from the top surface of the wafer (ray 1 in FIG. 5), and the second feature corresponds to the beam propagating through the wafer, and is reflected from the bottom surface (ray 2 in FIG. 5).

Figure 6:
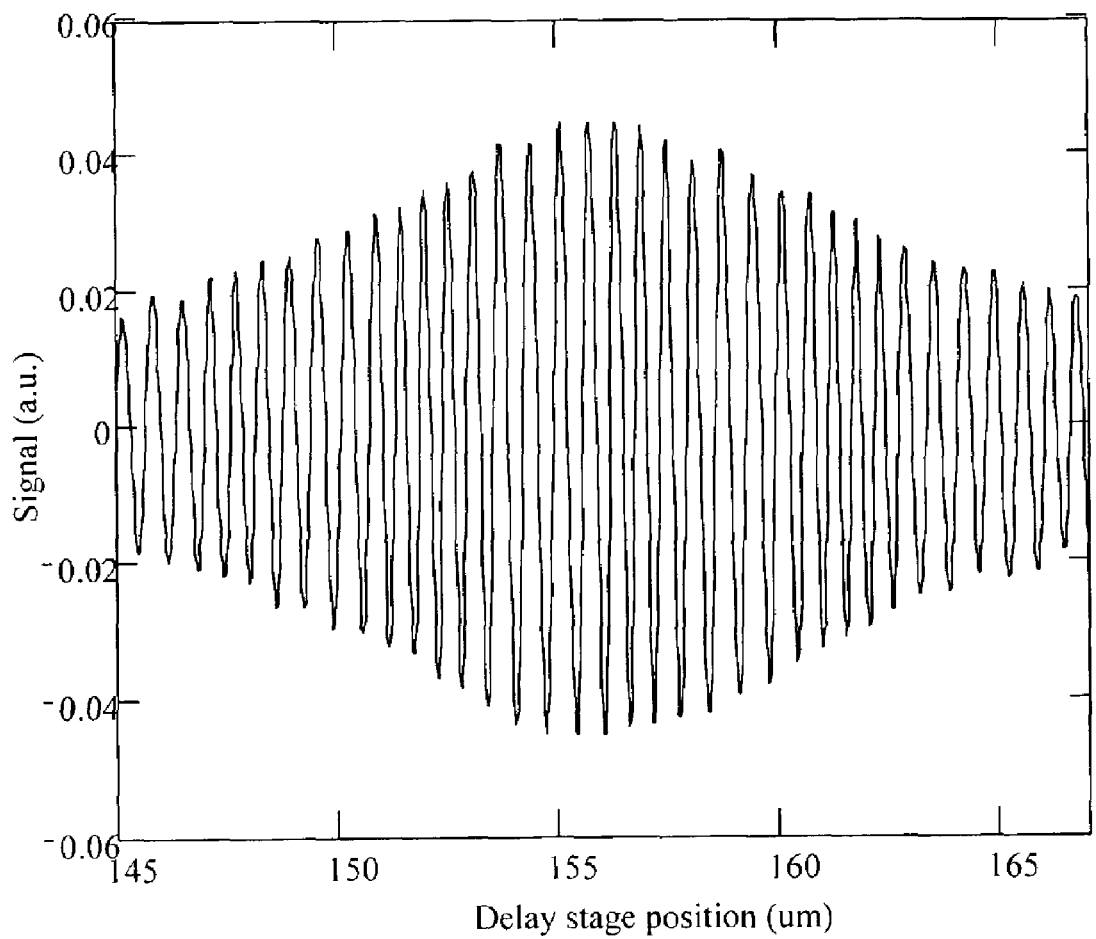
FIG. 6 is a resolved interference fringe visible in the expanded features shown in FIG. 4.
Figure 7:
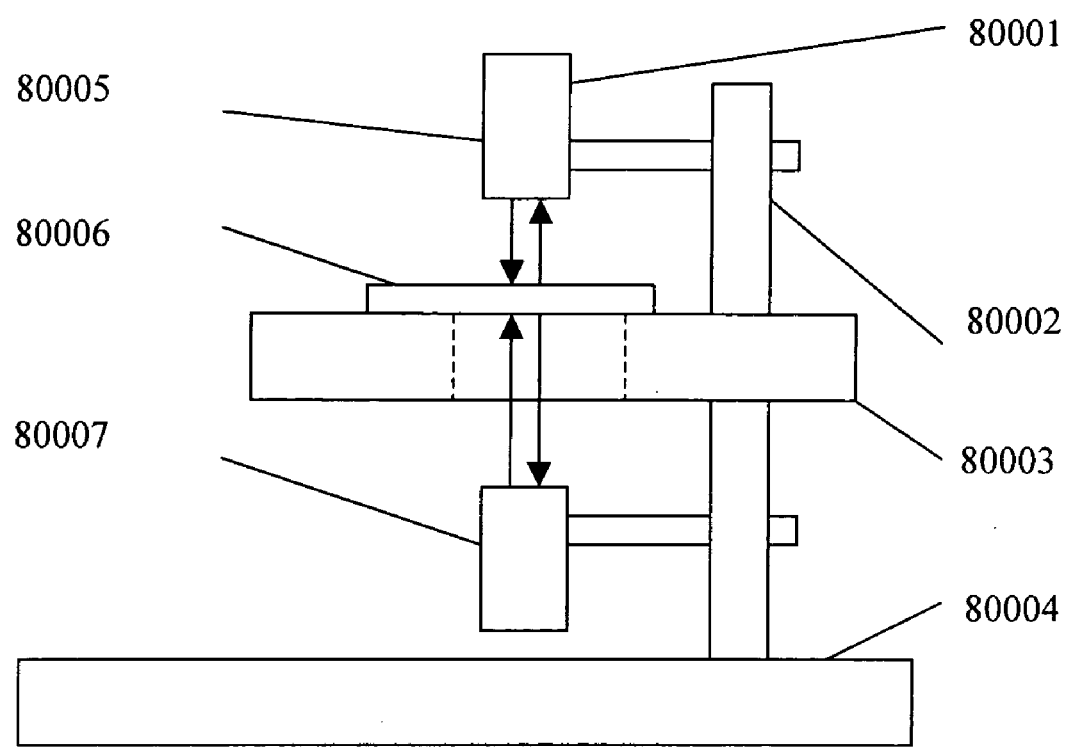
FIG. 7 depicts a two-probe arrangement for measurement of transparent samples.

Each of the interferometric features shown in FIG. 4 has a fine pattern of interference fringes as shown in FIG. 6. We use this fringe pattern as a more precise thickness gauge.

The interferometer was operating with power of probing light of about 1 uW, nominal wavelength of 1.3 um. In some designs, the optical power is increased to a range of 1–3 mW.

As we see from the above discussion, the signal indeed reveals fine structure characterized by period equal to one-half of the center wavelength of the broadband source. The detailed modeling of this structure allows the operator to determine the exact thickness of the material as described below.

The system diagram of the apparatus used in this invention is presented in FIG. 3. In order to collect data corresponding to interferogram such as shown in FIG. 4, the interferometric sensor must be able to collect simultaneously information about signal detected by the detector D and position of the delay stage d. The delay stage d is typically moving in an open loop configuration, and the position of the delay stage is monitored continuously.

In one particular implementation of this invention, the delay stage employing voice coil actuator was used and its position was varying approximately linearly with time and its position was monitored in open loop configuration using relatively coarse encoder with 0.5 micrometer nominal resolution. The maximum displacement of the stage was of the order of 10 mm, the frequency of periodic motion was in the range 10–20 Hz.

The resolution of the position of the stage was furthermore enhanced by means of the interpolation of the encoder signal collected as a function of time. In general several other position monitoring schemes may be implemented including interferometric schemes employing additional narrow band source such as commonly used in Fourier Transform Infrared Spectrometers where HeNe laser based interferometers are being used to sense the displacement of the delay stage.

The interferometric sensor can be used to measure sample thickness in several different locations, and in particular it can be used to map the sample.

In a general case, when a sample has several interfaces and is comprised of several materials of distinct optical properties, it is convenient to model such sample by using Jones matrix approach in case of isotropic materials, and Mueller matrix method in general case of depolarizing media [5]. The modeled values of complex reflection can be compared with experimentally measured values. The result of this comparison, which may or may not involve iterative fitting procedures, leads to determination of the thickness and optical properties of the optical materials. In order to illustrate this general approach, lets consider the case of a non-polarizing layered structure such as is commonly encountered in semiconductor technology.

Following [6] we describe a total electric field of the forward and backward traveling infrared beams by 2×1 column vector:

$$E(z) = \begin{bmatrix} E^+(z) \\ E^-(z) \end{bmatrix}$$

where $E^+(z)$ and $E^-(z)$ denote complex amplitudes of the radiation propagating towards the sample and reflected from the sample.

Since the system is linear, the amplitudes of the fields observed at two different planes z' and z'' are related by 2×2 scattering matrix transformation:

$$\begin{bmatrix} E^+(z') \\ E^-(z') \end{bmatrix} = \begin{bmatrix} S_{11} & S_{12} \\ S_{21} & S_{22} \end{bmatrix} \begin{bmatrix} E^+(z'') \\ E^-(z'') \end{bmatrix} \quad \text{Equation (4)}$$

where scattering matrix S depends upon details of the stratified medium between z' and z''. The above Equation can be written in a more concise form:

$$E(z') = S \cdot E(z'') \quad \text{Equation (5)}$$

By choosing z' and z'' to lie immediately on opposite sides of the interface between j and j−1 layers the Equation (5) becomes:

$$E(z') = I_{(j-1)j} \cdot E(z'') \quad \text{Equation (6)}$$

where $I_{(j-1)j}$ is a 2×2 matrix characteristic of interface j−1 and j alone.

If both z' and z'' lie inside the the j-th layer, then Equation (5) can be written as:

$$E(z') = L_j \cdot E(z' + d_j) \quad \text{Equation (7)}$$

where $L_j$ is 2×2 matrix characteristics of the layer j alone, and $d_j$ is the thickness of j-th layer. In case of the sample comprising of the m layers the scattering matrix can be expressed as a product of matrices:

$$S = I_{01} \cdot L_1 \cdot I_{12} \cdot L_2 \cdot \ldots L_m \cdot I_{m(m+1)} \quad \text{Equation (8)}$$

Explicit and somewhat expressions for matrices $L_j$ and $I_{(j-1)j}$ as function of complex refractive indices of the material j and j−1 are given in [6].

What is claimed is:

1. An apparatus for measuring the thickness of slabs of materials comprising:
    a low coherence fiber optic interferometer comprised of a low coherence light source in optical communication with a first end of a single mode optical 2×2 fiber optic coupler and a light detector in optical communication with a second end of the single mode optical 2×2 fiber optic coupler,
    a reference arm comprising a single mode optical fiber in optical communication with a polarization controller connected to a first beam shaping lens system directing light upon a reflective element,
    and a delay stage comprising the reflective element attached to an electromechanical actuator, varying the length of the optical path between the first beam shaping lens system and the reflective element,
    a signal arm comprising single mode optical fiber connected to a second beam shaping lens system directing light upon a sample,
    a sample stage supporting and positioning the sample in front of the second beam shaping lens system, signal conditioning electronics connected to the light detector,
    a digital to analog converter electrically connected to the signal conditioning electronics, an electronic device monitoring the position of the delay stage optically connected to the delay stage,
    and a computer, electrically connected to the digital to analog converter, and the electronic device monitoring the position of the delay stage, acquiring and analyzing measured interferograms.

2. An apparatus described in claim 1, wherein said sample supporting stage employs a vacuum chuck.

3. An apparatus described in claim 1, wherein said sample supporting stage employs an electrostatic chuck.

4. An apparatus described in claim 1, wherein said delay stage further comprises a linear actuator.

5. An apparatus described in claim 1 or 4 wherein said delay stage position is monitored by means of a linear encoder.

6. An apparatus as described in claim 1 wherein said reflective element is a corner-cube retro-reflector.

7. An apparatus as described in claim 1 wherein said reflective element is a mirror.

8. An apparatus as described in claim 1 wherein light is directed onto the surface of a sample by means of an optical microscope.

9. An apparatus as described in claim 1 further comprising a signal and comprising a single mode optical fiber connected to a polarization controller connected to a second beam shaping lens system directing light upon the sample.

10. An apparatus as described in claim 7 where polarization controller is a fiber optic polarization controlled based on stress induced birefringence effect.

11. An apparatus comprising two low coherence interferometer sensors where a first low coherence interferometer sensor is positioned on a side of a measured sample and a beam shaping lens system of the first low coherence interferometer sensor is directing light upon the surface of the measured sample and is in optical communication with the measured sample, where a polarization controller is in optical communication with a single mode optical 2×2 fiber optic coupler which is in optical communication with a signal arm and is in optical communication with a second beam shaping lens system, and
    a second low coherence interferometer sensor positioned approximately symmetrically to the first low coherence interferometer sensor, with respect to the plane of symmetry, which is a plane passing through the center of the measured the direction of the radiation emitted by the beam sample and perpendicular to shaping lens system of the first low coherence interferometer sensor, on another side of the measured sample, where the beam shaping lens system of the second low coherence interferometer sensor is directing light upon the surface of the other side of the measured sample and is in optical communication with the measured sample, and the direction of the light emitted by the beam shaping lens system of the second low coherence interferometer sensor is approximately collinear and anti-parallel to the direction of the light emitted by the beam shaping lens system of the first low coherence interferometer sensor, and the motion stage sample between the positioning the measured beam shaping lens systems of the first and the second low coherence interferometer sensors, is electrically and mechanically connected to the body of the apparatus supporting the low coherence interferometer sensors and beam shaping lens systems directing light upon the surfaces of the measured sample.

* * * * *